United States Patent

Rahenkamp et al.

[15] 3,671,683

[45] June 20, 1972

[54] SENTENCE ORIENTED DICTATION SYSTEM FEATURING RANDOM ACCESSING OF DICTATION SEGMENTS

[72] Inventors: Robert A. Rahenkamp; William R. Stewart, Jr., both of Lexington, Ky.

[73] Assignee: International Business Machines Corporation, Armonk, N.Y.

[22] Filed: June 29, 1970

[21] Appl. No.: 50,605

[52] U.S. Cl. .........179/100.2 MD, 179/100.2 B, 179/100.2 S, 179/100.1 DR, 197/19, 340/174.1 J

[51] Int. Cl. ....................................G11b 15/02, G11b 27/08

[58] Field of Search ........179/100.2 MD, 100.2 S, 100.1 DR, 179/100.2 B, 6 E, 84; 340/174.1 J, 172.5; 197/19, 20

[56] References Cited

UNITED STATES PATENTS

| | | | |
|---|---|---|---|
| 3,109,898 | 11/1963 | Gray | 179/100.2 MD |
| 3,222,460 | 12/1965 | Albanes et al | 179/100.1 DR |
| 3,248,705 | 4/1966 | Dammann et al | 340/172.5 |
| 3,423,743 | 1/1969 | Silverman | 179/100.2 MD |
| 3,488,443 | 1/1970 | Smith | 179/100.2 MD |

*Primary Examiner*—Bernard Konick
*Assistant Examiner*—Jay P. Lucas
*Attorney*—Hanifin and Jancin and D. Kendall Cooper

[57] ABSTRACT

The present invention concerns a system for recording audio signals on a record medium cooperating with a transducer means, with the record media having a plurality of segment storage areas, such as individual storage areas on a tape, belt or card, or the like, and with storage of information taking place on a sentence, paragraph, or letter basis under dictator control. The system includes means mounting a record medium for transducing operations to record and reproduce signals, a microphone input means having control buttons and a separate control panel with provision for random selection of signal tracks on the medium. In a preferred embodiment, the system includes a magnetic tape or belt medium recording-reproducing console with tracks on the medium arranged to store audio information by sentences, paragraphs, and letters. The unit may also be used for transcription purposes with accessing of the information under transcriber control.

2 Claims, 4 Drawing Figures

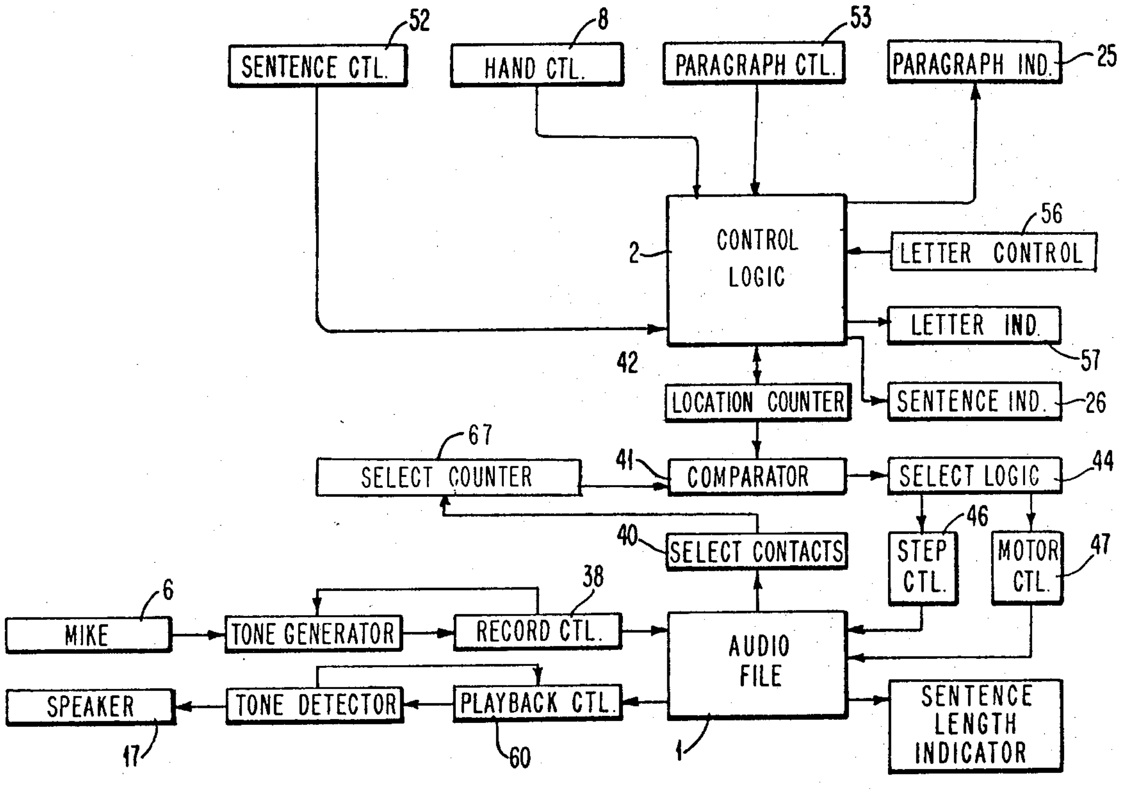
FIG. 1
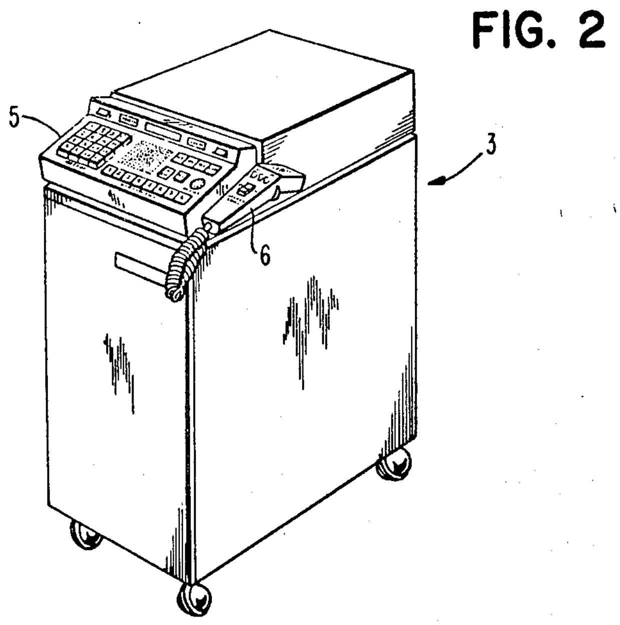
INVENTORS.
ROBERT A. RAHENKAMP
WILLIAM R. STEWART, JR.
BY D. Kendall Cooper
ATTORNEY

SENTENCE ORIENTED DICTATION SYSTEM FEATURING RANDOM ACCESSING OF DICTATION SEGMENTS

CROSS REFERENCES TO PATENTS, APPLICATIONS, AND OTHER MATERIALS

U.S. Pat. No. 3,222,460, N. J. Albanes and Matthew P. Langendorf, inventors, entitled "Multiple Station Selection System." U.S. Pat. No. 3,297,124, D. E. Sims, inventor, entitled "Data Recording and Printing Apparatus Capable of Responding to Changed Format."

U.S. Pat. No. 3,471,654, W. L. Dollenmayer, inventor, entitled "Transducer Driving Arrangement for Recording and Reproducing Apparatus."

U.S. Patent 3,512,137, John E. Jones et al., inventors, entitled "Correlated Recording, Reproducing, Printing, and Composing Apparatus."

U.S. Patent application, Ser. No. 699,259, filed Jan. 19, 1968 , with C. M. Fackler, et al., as inventors now U.S. Pat. No. 3,623,735; entitled "Dictating and Transcribing Apparatus with Automatic and Semi-Automatic Operator Controlled Facilities."

Publication "Message Announcement and Recording System," R. A. Kolpek, IBM Technical Disclosure Bulletin, Aug., 1967, Vol. 10, No. 3, pages 2220–222.

U.S. Patent application, Ser. No. 50683, filed concurrently herewith, with Robert A. Kolpek as inventor, and entitled "-Sentence Oriented Dictation System Featuring Random Accessing of Information in a Preferred Sequence under Control of Stored Codes."

OTHER REFERENCES

Customer Engineering Instruction Manual, Dictation, Dictation Equipment, IBM Models 211, 212, and 213, form No. 241–5071, dated Oct. 5, 1962.

Reference Manual, Dictation Equipment, IBM Models 211, 212, 213, and 214, form No. 241–5132, dated Oct. 22, 1962.

BACKGROUND OF INVENTION AND PRIOR ART

Prior dictation-transcription systems have incorporated facilities for recording and reproducing audio signals on a suitable medium, such as magnetic tape or belt, or the like, under control of the dictator and/or transcriber. Invariably, such prior systems contemplate the recording of signals in a fairly continuous, uninterrupted, and unsegmented fashion with no provision for rapidly locating segments of information. Some provision is made for stepping a transducer relative to the medium in a search operation, but such search operation is a rough search at best and the dictator or transcriber, as the case may be, seldom knows exactly what information has been located without taking time to listen to it. Provision has also been made in prior devices for such review of previously dictated material and recording over to correct the material, if desired. Since the material has been recorded fairly continuously and in an uninterrupted fashion, such correction procedures are somewhat difficult since the newly inserted information usually is longer or shorter than the information that it replaces.

Also, with prior devices, the dictator who is not completely organized before he starts dictation may wind up with a series of sentences and/or paragraphs that are not necessarily in a desired sequence as far as final copy is concerned. In such cases, the dictator must await the typing of a rough draft of the material, must then rework the material by deletion, insertion, and interlineation upon the draft version, and then await the retyping of the material into a final version. In many instances, two, three, and more drafts are necessary to get the material into the final preferred sequence desired by the dictator.

In summary, dictation-transcription systems heretofore have not conveniently provided for line, sentence, paragraph, or letter expansion and contraction. Further, it has not been possible to conveniently locate the beginning of individual sentences, paragraphs, and the like.

SUMMARY OF THE INVENTION

In overcoming some of the disadvantages of the prior art, the present invention contemplates dictation-transcription apparatus that also records and reproduces signals from a suitable medium, such as a magnetic tape or belt, or the like, with recording and playback under control of the dictator and transcription under control of the transcriber, as is usual. However, the present system is organized in a highly efficient and coordinated manner to enable rapid location of previously dictated material for review, editing, correction, etc. The present system is oriented about a dictation-transcription console having a dictator hand control and a control panel as well as auxiliary transcription facilities, as required. The apparatus records and reproduces signals on a magnetic tape or belt having substantial length, and with the audio information arranged in individual discrete segments on the medium thereby facilitating the organization of dictated material into useful segments, such as sentences, paragraphs, and letters, as may be desired. The dictator hand control is in the form of a microphone having the customary mode control switch to establish a Record, Listen, and Review mode as may be desired and a Dictate or Talk bar that is depressed during normal dictation in one direction in order to record signals and depressed in an opposite direction to initiate the generation of end of sentence and end of paragraph codes in the respective areas on the medium as dictation proceeds. The dictator hand control further has paragraph and sentence locating buttons operable in both a forward and reverse direction to enable the rapid accessing of individual sentences and paragraphs on the record medium. Thus, the system provides direct random access to any discrete sentence and/or paragraph.

The control panel comprises a number of mode control and display facilities including a matrix of paragraph buttons enabling the selection of individual paragraphs in any desired sequence as well as an indication by means of lamps of paragraphs that have been used and the paragraph presently in use. The control panel has a series of sentence buttons for selection and location of individual sentences within a selected paragraph, as well as associated lamps that indicate sentences already recorded in the paragraph presently in use as well as the sentence that is presently in use. A group of Section or Letter buttons is also provided to select individual letters, each normally comprising at least a paragraph and individual sentences. Means is further provided to establish a Transcription mode for transcribing of the recorded information.

With the foregoing facilities, any sentence or paragraph on the magnetic medium may conveniently be expanded or contracted as desired by the dictator up to the limits of the individual segment storage areas. As an example, each segment may accommodate dictated material up to 60 seconds in duration. A magnetic tape medium comprises a large number of sentence segments separated by permanent, nonerasable codes. Paragraphs comprise a number of sentences and paragraphs are also identifiable by permanent, nonerasable codes. Letters preferably comprise a number of paragraphs, such as three, which are set aside automatically during media scanning. The display of lamps on the console underneath the respective selecting buttons for paragraphs, sentences and sections, shows in a cumulative manner all sentences addressed, the discrete sentence presently being addressed, and the present mode whether in a Dictate or Review mode.

Facilities are also provided for rapid forward and reverse relative movement of the medium and transducer in the apparatus to rapidly locate any desired segment of information such as a sentence or paragraph. Means is also provided in the system for rapidly relocating the medium at the beginning of the next sentence location when this is necessary as upon completion of dictation of an individual sentence. The same applies to the repositioning to the first sentence of a new paragraph.

The recording of end of sentence and paragraph indications, such as tone signals in an automatic fashion under control of the microphone upon termination of each sentence and/or paragraph, as the case may be, facilitates the relocation of the transducer with respect to the medium in order to access the next sentence segment both during playback during the dictation operation and during the transcription operation.

OBJECTS

Accordingly, a primary object of the present invention is to provide a dictation-transcription system in which audio segments, such as sentences and paragraphs, are stored on an individual discrete category basis enabling rapid accessing of individual segments, as desired.

Another object of the invention is to provide a dictation-transcription system of the nature described with complete manual controls for the dictator and transcriber to facilitate the rapid location of information segments in the system.

Still another object of the present invention is to provide a sentence oriented dictation system with sentences further organized by paragraphs and paragraphs by letters and recording of dictated material on a magnetic medium, each sentence being allotted a particular storage area on the medium.

A still further object of the present invention is to enable the efficient and convenient recording of segments of information, such as sentences and paragraphs in individual storage areas on a medium.

Still another object of the present invention is to provide a system of this nature having control adjuncts enabling efficient and convenient initiation of the required accessing, selection, and mode control functions in the system both during dictation and transcription.

The foregoing and other objects, features, and advantages of the invention will be apparent from the following more particular description of the preferred embodiment of the invention as illustrated in the accompanying drawings.

DRAWINGS

In the drawings:

FIG. 1 is a block diagram indicating various system components and their interrelationship and including in the upper portion the automatic control and indicating facilities and in the lower portion the dictation control facilities.

FIG. 2 is a right front perspective view of a console housing the various system components and including a hand control set and a control panel for establishment of modes and functions in the system.

Figure 3A:
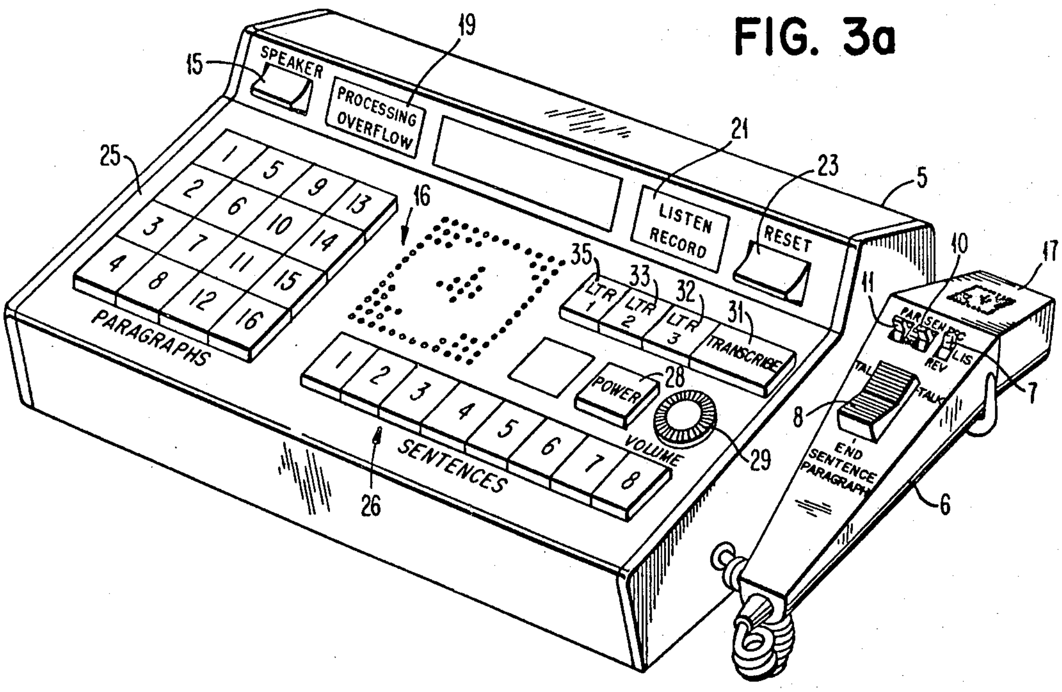
Figure 3B:
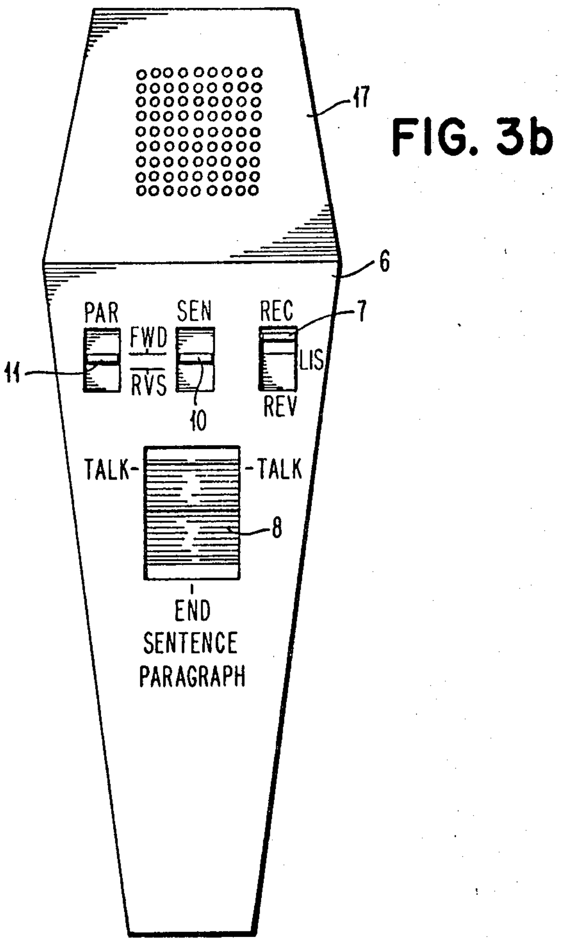

FIG. 3*a* is a more detailed view of the control panel and microphone hand set from the console of FIGS. 2, and FIG. 3*b* is a closeup view of the microphone hand set itself.

TERMINOLOGY AND CONTROLS

Prior to proceeding with a discussion of the system block diagram in FIG. 1, it is believed that a consideration of various terminology and controls shown particularly in FIG. 2, 3*a*, and 3*b* will prove useful.

Dictation-transcription unit 3, FIG. 2, contains an audio file 1 utilizing an elongated magnetic media, such as a tape or belt. Control logic 2 controls operation of the system. Positioned on the upper front portion of apparatus 3 is a control console 5 and a microphone handset 6 both shown in greater detail in FIG. 3*a*. The front of microphone 6 is further shown in FIG. 3*b*.

Some of the control facilities on control panel 5 and microphone 6 are as follows:

Record-Listen-Review Button 7. This button in the upper position establishes a Record mode, in the center position a Listen or playback mode, and in the lower position a Review mode which reverses the direction of movement of the magnetic media for a desired distance to enable the dictator to listen back to the same sentence that he is dictating.

Talk-End Sentence or Paragraph Bar 8. This bar has an upper portion that when depressed initiates relative movement of the transducer and recording medium to enable the recording of information in a selected sentence area on the medium. When the dictator has completed the dictation of the sentence, he depresses the lower portion of the Talk bar once to indicate the end of the sentence. This automatically initiates recording of a tone at the end of the sentence material in that particular track and also steps the audio file 1 to the next sentence track. Upon termination of a paragraph, the dictator depresses the bar 8 downwardly twice in order to record two tones at the end of the sentence in question, thereby indicating termination of the paragraph. This also initiates stepping of the apparatus to the next paragraph section. The tone in question in the present case may be an 80 cycle tone. Ends of letters may be indicated by three tones.

Sentence Button 10. This button when moved to the upper position, moves the media forwardly sentence by sentence to access sentences in the forward direction and, when depressed downwardly, moves the medium in a reverse direction to access sentences in the reverse direction. The system provides for the movement of the medium to the last previously recorded sentence in the reverse direction. That is, those sentences having no recorded information in them are skipped.

Paragraph Button 11. This button when moved upwardly to the forward position moves the medium forwardly to succeeding paragraph locations and, when moved downwardly, moves the medium reversely to preceding paragraph locations on the medium.

Considering the control console 5, this console has a number of control buttons and lamp indicators. A speaker button 15 selects speaker 16 or microphone output 17, as desired by the dictator.

Processing-Overflow Lamps 19. The Processing lamp indicates that the system is in use, while the overflow lamp indicates that the dictator has exceeded the capacity of an individual sentence.

Listen-Record-Lamp 21. This indicator comprises an upper Listen portion and a lower Record portion indicating the respective mode of the system in accordance with the status of control button 7 on microphone 6.

Reset Button 23. This button when depressed by the operator resets the system for recording of new information.

Paragraph Selection and Indicating Buttons 25. These buttons, as an example, comprise a matrix of 16 paragraph selection buttons that are depressed to locate paragraphs on a random basis as desired by the dictator or transcriber during operation of the system. The buttons are translucent and underneath each button is a lamp that is energized at a relatively low level to indicate that the paragraph in question has been used before and that are energized at a relatively high level to indicate the current paragraph that is in use by the dictator or transcriber.

Sentence Selection and Indicating Buttons 26. These buttons, like the paragraph buttons, are translucent and comprise eight sentence selection and location buttons, each having an indicating lamp thereunder and that are depressed to locate sentences on a random basis within a selected paragraph. When the lamp is energized at a relatively low level, it indicates the sentence has been used, that is, has information in it, and when energized at a relatively high level, it indicates that the sentence is currently in use.

Power On-Off Button 28. Depression of this button turns power on and off to the system.

Volume Control 29. This control is adjusted to establish a desired level of sound from speaker 16.

Transcribe Control Button 31. This button establishes a Transcribe mode of the apparatus enabling recognition of the tone at the end of each sentence to step forwardly to the next sentence and the two tones at the end of each paragraph to step forwardly to the next succeeding paragraph.

Letter Buttons 32, 33, and 35. These buttons enable selection of three individual letter segments on the medium, each letter normally comprising a number of paragraphs.

SYSTEM DESCRIPTION

FIG. 1 is a block diagram showing the various components of the dictation-transcription system according to the present invention and as housed in the console of FIG. 2. The upper portion of FIG. 1 represents the automatic control and indicating sections of the system while the lower portion represents the dictation control functions with which the operator is most concerned.

Of primary interest in the block diagram of FIG. 1 is the audio file 1 and control logic 2. In the present system, the audio file is preferably in the form of a belt or tape medium. The record medium in the present case accommodates three letters, each having up to 16 paragraphs, each comprising eight sentences. To access the individual segments, the system is provided with segment accessing facilities that may include high speed forward and reverse clutches. The tape direction and distance to any discrete sentence from any location is determined by a system of counters. Counter 42 registers the number of spaces passed through from the beginning of the tape. A second counter 67 shows the desired sentence being addressed from the matrix keyboard. By comparing these two counters, the direction and distance necessary to reach the desired location is calculated by select logic 44. All of these elements will be described in detail subsequently. The audio file could make use of some mechanisms that are comparable to those taught in the Albanes and the 210 series dictation manuals in the Cross-reference section or mechanisms taught in the Fackler et al. patent application which also makes use of a magnetic belt record medium. Further, it is contemplated that the elongated magnetic tape shown in the Sims patent or the magnetic card medium shown in the Dollenmayer patent could be adapted for use in the present system.

A brief description of the components in FIG. 1 will illustrate the operation of the system.

It will be recalled that depression of the Reset button 23 places the system in a condition for recording an entirely new sequence of sentences and paragraphs. The dictator manipulates microphone 6 (mike) to establish a Record mode by means of button 7 and record control circuit 38. This starts the relative movement of the magnetic medium in the audio file 1 with respect to the transducer upon depression of the Talk bar 8 by the dictator to record the material that he desires. Initially, lamps under paragraph button 1 and sentence button 1 are illuminated on control panel 5, FIG. 3. It should be pointed out that upon depression of the Reset button, the entire medium surface is preferably erased except for the permanent codes. During operation of the system in a Record mode, the drive clutch is activated upon depression of Talk bar 8 and the amplifier circuits are energized to amplify signals from microphone 6 for recording in the first sentence, first paragraph, on the media. The marking of the sentence cell 1 as being in use occurs upon depression of Talk bar 8.

Upon completion of the sentence, the dictator depresses Talk bar 8. This records a tone on the medium and initiates movement to the next sentence segment. This involves the select contacts 40, select counter 67, the comparator circuit 41, the location counter 42, and select logic 44 which controls the operation of a stepping control circuit 46 and a motor control circuit 47. The medium and transducer are relatively moved to the next sentence segment track and the No. 2 sentence selection button on control panel 5 is energized at a higher intensity. The No. 1 button remains illuminated at a relatively low level to indicate that it has information stored in it.

The dictator may reserve sentence locations by simply recording an end-of-sentence code at the beginning of any unused sentence location. To do this, talk bar 8 is depressed downwardly after addressing an unused sentence location. This automatically records a tone in the unused track. Control circuit 46 steps the apparatus to the next succeeding sentence track. The corresponding sentence buttons 1–8 are not illuminated. This indicates that the sentences in question are unused and available for possible later use. During playback, the tone recorded at the beginning of the sentence tracks in question will upon recognition immediately initiate stepping to the succeeding sentence track until information is located for playback.

Sentence and paragraph control circuits 52 and 53 cooperate with control logic 2 to select sentence and paragraph segments on the medium. Letter control 56 controls accessing of letters. Control logic 2 controls the paragraph indicators 25 on control panel 5, letter indicators 57, and sentence indicators 26 on control panel 5 to appropriately illuminate these as required during operation.

Upon recording the last sentence in any paragraph, the dictator rocks the talk bar 8 twice in the lower portion which records an appropriate single tone of different frequency or two tones on the magnetic media 1. The selection and indicator buttons 25 and 26 are operated in such a fashion that paragraph button 2 is illuminated at a relatively high level together with sentence button 1.

Paragraph button 1 continues to be illuminated at a fairly low level to indicate that this paragraph has information stored in it.

Some of the other operations of interest controlled by microphone 6 are as follows.

Review - When the dictator depresses button 7 downwardly to the lowermost position, a short roll back of the magnetic medium occurs with respect to the transducer to enable the review of the information just dictated. Button 7 is spring loaded from the lower Review position to the center Listen position so that it will return to the Listen position and establish a Listen mode for review of the information, During such mode, playback control 60 provides signals to speaker 17 (or speaker 16) as selected by the selection button 15. Accordingly, operation of the Review button is not sentence oriented, that is, it merely involves the review of information within the same sentence that is currently in use. The dictator cannot move past the beginning of the sentence presently in use by operation of the Review button.

Reverse by Sentence and Paragraph - If sentence button 10 is operated in the reverse direction, the system relatively moves the magnetic medium and the transducer back to the beginning of the same sentence that is presently in use. This assumes that the button 10 is depressed downwardly only once. Further depression of button 10 downwardly results in the system stepping back to the previously recorded sentence. Intervening unrecorded sentences are skipped. Accordingly, continued depression of button 10 downwardly results in movement of medium and transducer segment by segment at a regular cadence with appropriate movement of the illuminating lamps under the sentence buttons 26. If the system is in a Record mode, the stepping discontinues when the dictator lets up on button 10 and the system indexes to the selected segment and stops. If the system is in a Playback mode, the system automatically indexes to the selected segment and starts playing back the information in the sentence reached after the dictator lets up on button 10. A comparable operation occurs upon depression of the paragraph button 11 with movement paragraph by paragraph to the extent of the paragraphs provided, which in this case is 16.

Sentence Forward and Paragraph Forward - Movement of the appropriate sentence button 10 and paragraph button 11 to the upper position results in accessing of segments on the medium in a forward direction sentence by sentence or paragraph by paragraph, as the case may be, to access the segments of information to the extent desired by the dictator.

Random Selection of Sentences and Paragraphs - It is possible for the dictator, while he is using the equipment, to forego the stepping controls 10 and 11 to go directly to a desired sentence and paragraph location by appropriate depression of the paragraph and/or sentence button that he may desire. Thus, the system provides for a completely random key selection of sentences and paragraphs.

It is thus seen that the various controls and components of the system establish considerable flexibility in the processing of audio information particularly with respect to the organization of such information in segments, such as sentences and paragraphs, and the review and modification of such information.

A useful alternative to the matrix keyboard is a 12 key (or similar) Touch-tone telephone pad. By the use of code keys thereon, sentences, paragraphs, and letters could be selected.

It would also be possible to dispense with control panel 5 or its equivalent entirely and effect all controls from the microphone hand set 6 alone.

ELECTRONIC AND MECHANICAL COMPONENTS

Reference is made to the Kolpek application for a description of a system using a magnetic belt medium incorporating principles of operation that are based on the present invention and further featuring a memory unit storing coded address information to control accessing of information segments. Stepping control for either system could take the form of that shown in the Kolpek publication of Aug., 1967.

TRANSCRIPTION

The system is placed in a Transcribe mode by depression of button 31 and during such mode, sentences and paragraphs on the magnetic medium 1 are played back under transcriber control. An auxiliary control, not shown, may be provided for connection into the console 3 to enable foot control operation of the system by the transcriber. It is entirely feasible to provide an additional control adjunct which upon depression rapidly re-records the information on magnetic medium 1 onto a second permanent medium for subsequent transcription. It is entirely feasible, of course, to provide a separate console that is oriented purely for transcription purposes and incorporating no recording facilities, as such.

It is thus seen that the objects set forth at the outset have been accomplished by the present system and that the system provides an unusual degree of flexibility and convenience in the recording and reproducing of audio information together with review and modification of such information as may be desired.

The arrangement of the system with its selection capabilities, particularly including the paragraph and sentence buttons, facilitates the rapid review and location of the previously dictated audio segments by the dictator for the purpose of editing or redictating such previously dictated material. The dictator is able to go directly to the beginning of a desired paragraph or sentence without having to scan all the intermediate material in other paragraph or sentence segments.

While the invention has been particularly shown and described with reference to a preferred embodiment, it will be understood by those skilled in the art that various changes in form and detail may be made without departing from the spirit and scope of the invention.

What is claimed is:

1. An audio system for transducing signals on a record medium, said medium having a plurality of signal storage areas arranged in a plurality of paragraphs and sentences of information, each paragraph comprising at least one sentence, wherein said signal areas on said medium further comprise a plurality of letters of information, each letter comprising at least one paragraph, comprising:

a transducer;

means mounting said medium in a signal-transducing relation with said transducer;

means for relatively moving said transducer and said medium to trace a plurality of signal storage areas in said medium for transducing of audio information therein;

selection means including individual control adjuncts corresponding to said signal storage categories for randomly selecting in any order an individual signal storage category on said medium for transducing of signals by said transducer;

paragraph selector means in said selection means for randomly selecting individual paragraphs of audio information on said medium;

sentence selector means in said selection means for randomly selecting individual sentences of audio information on said medium and letter selector means in said selection means for randomly selecting individual letters on said medium.

2. The system of claim 1, further comprising:

operator controlled tone generating means; and tone recording means responsive to said generating means to record one tone at the end of recorded information in a sentence, two tones at the end of recorded information in the last sentence of a paragraph and three tones at the end of recorded information in the last paragraph of a letter.

* * * * *